April 15, 1930.  S. BROWN  1,754,383
INDICATOR FOR AUTOMOBILE LUBRICATION
Filed Sept. 4, 1928
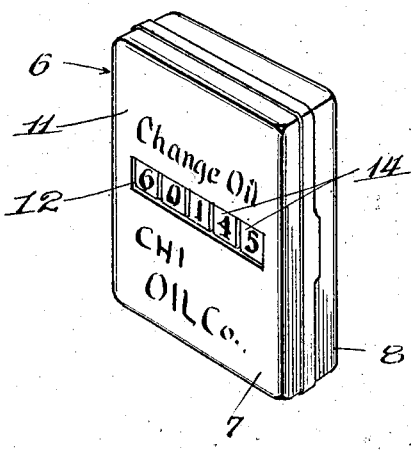
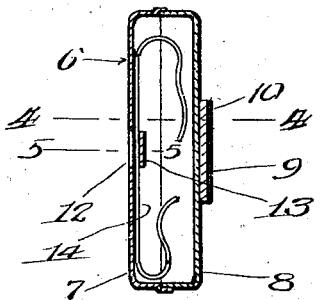
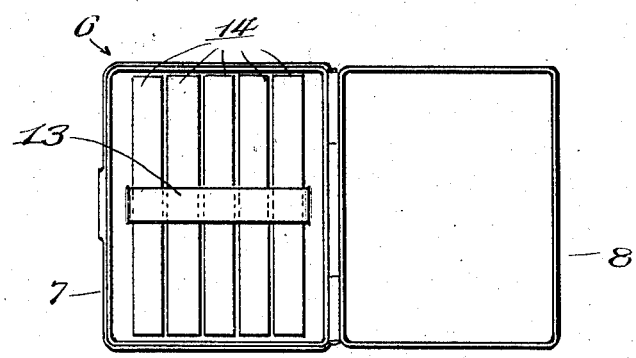
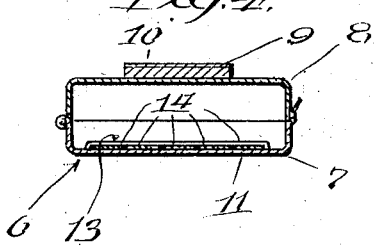
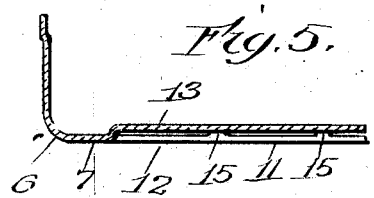

Patented Apr. 15, 1930

1,754,383

UNITED STATES PATENT OFFICE

STEWART BROWN, OF CHICAGO, ILLINOIS

INDICATOR FOR AUTOMOBILE LUBRICATION

Application filed September 4, 1928. Serial No. 303,700.

This invention relates to indicators for automobile lubrication, and its principal object is to provide an extremely simple and inexpensive device for use in reminding the automobile owner of the necessity of changing the oil in the crank case when the mileage shown by the speedometer agrees with that displayed by the indicator.

It is well known that the efficient operation of an automobile motor depends, in a great measure, upon proper lubrication of the moving parts thereof, and that oil deteriorates from usage and must be replaced with fresh oil after the motor has been operated for a predetermined period of time. It has been found that when an automobile has traveled approximately five hundred miles, the lubricating properties of the oil in the crank case have become impaired to such an extent that it is highly desirable to replace the deteriorated oil with a fresh supply. Many attempts have been made to provide means for indicating the time when the oil should be changed, but such means are usually expensive and complicated and have not become popular.

The present invention consists, therefore, in an indicator for automobile lubrication having a box-like structure provided with a single sight opening through which one or a plurality of strips or ribbons may be seen, which strips or ribbons contain numerals to indicate mileage and may be easily adjusted to change the value designated by the characters visible through the opening. The invention further consists in a device as set forth in which the sight opening is formed by punching back the metal of the front wall of the receptacle so as to leave a sight opening with a bar behind it, the bar forming a backing for holding the strips or ribbons in place at the sight opening.

The invention further consists in the several novel features hereinafter fully set forth and described.

The invention is fully illustrated in the drawing accompanying this specification in which—

Figure 1 is a perspective view of an indicator for automobile lubrication showing a simple embodiment of the present invention;

Fig. 2 is a vertical cross section therethrough;

Fig. 3 is a side elevation of the device showing the same opened out to expose the interior therof;

Fig. 4 is a horizontal section taken on the line 4—4 of Fig. 2; and

Fig. 5 is a detail horizontal section upon an enlarged scale, taken on the line 5—5 of Fig. 2.

Referring to said drawing, the reference character 6 designates a box-like receptacle preferably in the form of two hinged together halves 7 and 8, one of which is flanged, so that it can fit over the edge portion of the other. If desired, a block 9 may be secured to the rear face of the receptacle and provided with a gummed face portion 10, whereby the device may be adhesively secured to some part of the automobile body, the instrument board or wind shield.

In the front wall 11 of the receptacle is formed a single sight opening 12 which extends crosswise of the receptacle, and said sight opening is preferably formed by punching back the metal defining the sight opening so as to leave a bar 13 offset behind and spaced away from the sight opening sufficiently to permit a single strip or a plurality of strips or ribbons 14 to pass between the offset bar and inner face of the wall 11 of the receptacle. The strips or ribbons 14 may be of any desirable length, and along the front face of each strip is printed the digits 0 to 9, so that by properly moving the strips or ribbons across the sight opening any desired whole number may be displayed through the sight opening. If desired, narrow ribs 15 may be formed between the upper or lower edge of the sight opening and the offset bar 13, which ribs serve to space the strips or ribbons apart, and also to hold them in proper position relative to each other.

In use, the mileage indicated on the speedometer is noted and if it is desired to change oil after the automobile has been driven five-hundred miles, the strips or ribbons are adjusted so as to display through the sight opening a whole number, greater by the sum of five hundred than the mileage indicated on the speedometer. The ends of these strips or ribbons are then tucked into one half of the receptacle and two parts thereof closed. Inasmuch as the device is constantly before the driver of the vehicle, he will observe on the indicating device that the oil must be changed when the reading on the speedometer agrees with that on the indicating device, and when the proper time has arrived and oil has been changed, he may reset the device to indicate when the oil should again be changed.

From the above, it is evident that a very simple and inexpensive device has been produced by means of which one may accurately indicate when oil should be changed in the motor of an automobile. In view of the fact that the device is composed of a minimum number of parts and may be made at such an extremely low cost, it may be used as a premium to be given away by oil companies or other concerns for the purpose of advertising their products.

There are no moving parts, nor any parts which are likely to go out of order.

By making the strips or ribbons of flexible material they may be as long as or a greater length than the receptacle and their ends may be folded into or tucked into the receptacle.

Other variations of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. An indicator for automobile lubrication comprising a closed receptacle provided with a cover containing a sight opening having an offset bar behind the same which extends lengthwise of the sight opening, and a flexible number displaying strip of greater length than the receptacle slidably mounted between said sight opening and bar and held in place by said bar, said flexible strip being capable of adjustment in a direction transversely of the bar and foldably contained within the receptacle.

2. An indicator for automobile lubrication comprising a closed receptacle having a supporting element adapted for attachment to an automobile structure, said receptacle having a cover containing a single sight opening and an offset bar behind the same which extends lengthwise of the opening, and a series of flexible number displaying strips of greater length than the receptacle slidably held between said sight opening and bar, said flexible strips being capable of adjustment in a direction transversely of the bar and foldably contained within the receptacle and the sight opening being proportioned to display one set of numbers.

3. In an indicator for automobile lubrication, a receptacle composed of two secured together parts, one part being formed with a struck up rectangular portion to leave a sight opening and there being spacing ribs between one edge and said sight opening and the struck up portions, and a series of strips adjustably secured between said rectangular portion and sight opening and spaced apart by said spacing ribs, each strip having disposed on its front side the digits from 0 to 9, and said sight opening being proportioned to display one row of digits.

STEWART BROWN.